United States Patent
Kobayashi et al.

(10) Patent No.: US 7,698,057 B2
(45) Date of Patent: Apr. 13, 2010

(54) MAP DISPLAY CONTROL APPARATUS, PROGRAM PRODUCT THEREFOR, AND METHOD FOR CONTROLLING AN IN-VEHICLE NAVIGATION APPARATUS

(75) Inventors: Keita Kobayashi, Kariya (JP); Akihiro Gomi, Okazaki (JP)

(73) Assignee: DENSO CORPORATION, Kariya (JP)

( * ) Notice: Subject to any disclaimer, the term of this patent is extended or adjusted under 35 U.S.C. 154(b) by 188 days.

(21) Appl. No.: 11/896,811

(22) Filed: Sep. 6, 2007

(65) Prior Publication Data
US 2008/0065323 A1   Mar. 13, 2008

(30) Foreign Application Priority Data
Sep. 7, 2006   (JP) .............................. 2006-242701

(51) Int. Cl.
*G01C 21/00* (2006.01)
(52) U.S. Cl. .................. 701/200; 340/988; 360/69; 360/71
(58) Field of Classification Search ................ 701/209, 701/200; 360/69, 71; 340/988
See application file for complete search history.

(56) References Cited

U.S. PATENT DOCUMENTS 5,930,738 A * 7/1999 Jones .......................... 702/132
7,171,305 B2 * 1/2007 Minato et al. ............... 701/209

* cited by examiner

*Primary Examiner*—Tuan C To
*Assistant Examiner*—Redhwan Mawari
(74) *Attorney, Agent, or Firm*—Posz Law Group, PLC

(57) ABSTRACT

An in-vehicle navigation apparatus is equipped with (i) an HDD for recording map data for display and, further, (ii) an external memory, which is not an HDD and in which the map data recorded in the HDD can be copied. The navigation apparatus performs the following: when the main power is supplied to the map display device, the altitude of the position of the vehicle (startup altitude) is specified; when the specified startup altitude is equal to or higher than a reference altitude, the map data are read from the external memory and the corresponding map is thereby displayed on an image display device, with the HDD not activated; and when the specified startup altitude is lower than the reference altitude, the map data are read from the HDD and the corresponding map is thereby displayed on the image display device.

8 Claims, 1 Drawing Sheet

મેપ DISPLAY CONTROL APPARATUS, PROGRAM PRODUCT THEREFOR, AND METHOD FOR CONTROLLING AN IN-VEHICLE NAVIGATION APPARATUS

CROSS REFERENCE TO RELATED APPLICATION

This application is based on and incorporates herein by reference Japanese Patent Application No. 2006-242701 filed on Sep. 7, 2006.

FIELD OF THE INVENTION

The present invention relates to a map display control apparatus and a program product therefore, and further a method for controlling an in-vehicle navigation apparatus.

BACKGROUND OF THE INVENTION

A map display control apparatus is mounted in a vehicle for displaying a map in an image display device. The apparatus sometimes uses a hard disk drive (henceforth HDD) as a device for storing map data for display. When used at a position of an altitude of 3000 m or higher, an HDD has a property to be breakable.

To that end, a technology is known which is equipped with an HDD along with a secondary storage other than an HDD, as a map data storage. In this technology, such a map data storage is switched from the HDD to the secondary storage when the subject vehicle advances into a high ground exceeding the altitude of 3000 m, thereby stopping the operation of the HDD.

For example, the map display control apparatus (specifically navigation apparatus) of Patent document 1 functions as follows. When the subject vehicle advances from a ground with an altitude of 3000 m or lower to an higher ground exceeding the altitude of 3000 m during the operation, the data in an HDD is copied to other memory (for example, flash memory as another rewritable memory) and the operation of the HDD is then stopped.

However, there is no description about the operation of the HDD immediately after the startup of the map display control apparatus in the Patent document 1. In general, immediately after being started, a conventional map display control apparatus having an HDD starts (i.e., activates) the HDD to thereby read data such as a program in the HDD. Therefore, in the technology like Patent document 1, when the map display control apparatus starts at a position or ground with an altitude of 3000 m or higher, the HDD may be automatically activated. In such a case, the risk of breakage of the HDD becomes high.

Patent document 1: JP-2004-317385 A

SUMMARY OF THE INVENTION

An object of the present invention is to reduce a possibility of breakage of an HDD when a map display control apparatus equipped with the HDD is started in a high ground.

To achieve the above object, as an example of the present invention, a map display control apparatus in a vehicle is provided as follows. A first storage that is a hard disk drive is included to record map data for displaying. A second storage that is different from a hard disk drive is included to record at least a portion of the map data and be capable of holding recorded data with a main power of the apparatus off. A startup altitude specification unit is configured to specify a startup altitude, which is an altitude of a position of the vehicle at a startup when a supply of the main power is started, while the first storage is not activated. A startup control unit is configured to read the map data from the second storage to thereby cause an image display device to display a map based on the read map data while the first storage is not activated when the specified startup altitude is equal to or higher than a reference altitude, and to activate the first storage and read the map data from the first storage to thereby cause the image display device to display a map based on the read map data when the specified startup altitude is lower than the reference altitude.

As another example of the present invention, a method is provided for controlling an in-vehicle navigation apparatus having for recording map data a hard disk drive and an additional rewritable memory different from a hard disk drive. The method comprises: specifying a startup altitude, which is an altitude of a position of the vehicle at a startup when a supply of the main power to the navigation apparatus is started, while the hard disk drive is not activated; reading the map data from the additional rewritable memory to thereby cause an image display device to display a map based on the read map data while the hard disk drive is not activated when the specified startup altitude is equal to or higher than a reference altitude; and activating the hard disk drive and reading the map data from the hard disk drive to thereby cause the image display device to display a map based on the read map data when the specified startup altitude is lower than the reference altitude.

BRIEF DESCRIPTION OF THE DRAWINGS

The above and other objects, features, and advantages of the present invention will become more apparent from the following detailed description made with reference to the accompanying drawings. In the drawings:

FIG. 3 shows a flow chart of a program executed by the control circuit at startup when an ACC turns on.

DETAILED DESCRIPTION OF THE PREFERRED EMBODIMENTS

Figure 1:
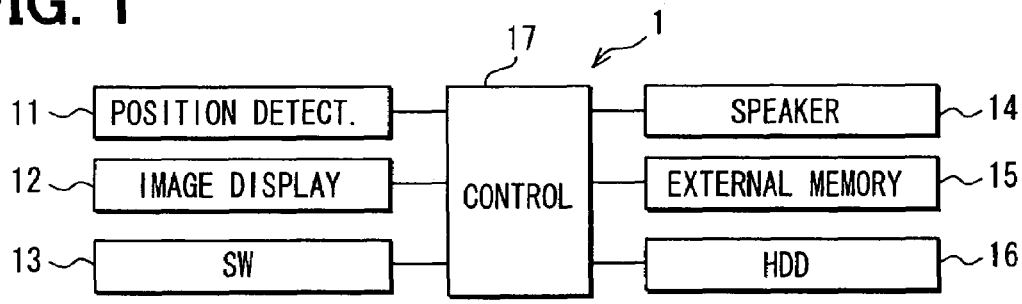
FIG. 1 shows a hardware configuration of a navigation apparatus according to an embodiment of the present invention.

An embodiment of the present invention is directed to a navigation apparatus as a map display control apparatus for a vehicle. FIG. 1 shows a hardware configuration of an in-vehicle navigation apparatus 1 mounted in a subject vehicle. This navigation apparatus 1 includes the following: a position detection unit 11, an image display device 12, an operation switch group 13, a speaker 14, an external memory 15, a hard disk drive (henceforth HDD) 16, and a control circuit 17.

The position detection unit 11 has known sensors or the like (non illustrated) such as a geomagnetic sensor, a gyroscope, a speed sensor, and a GPS receiver, and outputs, to the control circuit 17, information based on individual properties of the sensors for specifying a current position and heading direction of the vehicle.

The image display device 12 displays images for users based on video signals outputted from the control circuit 17. The operation switch group 13 is configured as an input device for a user such as multiple mechanical switches formed in the navigation apparatus 1 or touch panel overlaid on a screen of the image display device 12. Signals based on inputs by the user are thus outputted to the control circuit 17.

The external memory 15 is a rewritable storage other than an HDD and able to continue holding the data even if the main power supply of the map display control apparatus is turned off. For example, the external memory 15 may be a backup RAM or a nonvolatile memory such as an EEPROM or flash memory.

The HDD 16 stores data such as map data for route guide and programs executed by the control circuit 17. The map data include position information and kind information on roads, position information and kind information on intersections, information on connection relationships of intersections and roads, etc.

The control circuit 17 is equivalent to a computer and equipped with a CPU, RAM, and ROM (none illustrated). A program for operation of the navigation apparatus 1 is read from the ROM, external memory 15, and HDD 16 and executed. In the execution, information is read from the RAM, ROM, external memory 15, and HDD 16 and information is written in to the RAM, external memory 15, and HDD 16. Further, the control circuit 17 communicates signals with the position detection unit 11, image display device 12, operation switch group 13, or speaker 14.

For instance, processes executed by the control circuit 17 using the program include a current position specification process, a guide route calculation process, and a route guide process.

The current position specification process specifies a current position and heading direction of the vehicle using technology, such as well-known map matching, based on signals from the position detection unit 11. The information specifying the current position is a latitude, longitude, and altitude.

The guide route calculation process receives an input of a destination by the user via the operation switch group 13, and computes an optimal guide route from the current position to the destination based on the map data.

The route guide process reads map data, and outputs images, in which computed guide route and current position, etc. are superimposed on the read map data, to the image display device 12. Further, the route guide process outputs via the speaker 14 a guide speech which directs right-turn, left turn, etc. when needed, e.g., when the subject vehicle is about to reach a guided intersection.

In addition, when reading a program required to execute a certain process, the control circuit 17 first refers to operation mode information recorded in the external memory 15. Here, it is determined whether the present operation mode indicated by the operation mode information is a usual operation mode or a high ground operation mode. When the usual operation mode is determined, the corresponding program is read from the HDD 16. When the high ground operation mode is determined, the corresponding program is read from the external memory 15.

Moreover, in the guide route calculation process, the route guide process, etc., the control circuit 17 determines whether the present operation mode is the usual operation mode or the high ground operation mode based on the operation mode information recorded in the external memory 15, when reading the map data. When the usual operation mode is determined, it reads the corresponding map data from the HDD 16. When the high ground operation mode is determined, it reads the corresponding map data from the external memory 15.

Moreover, during the operation, the control circuit 17 carries out repeat execution of a program 100 in order to change the operation modes and copy the program and map data stored in the HDD 16 to the external memory 15 if needed.

Here, this program 100 may be recorded in any one of the ROM of the control circuit 17, external memory 15, and HDD 16.

In execution of this program 100, the control circuit 17 specifies the present three-dimensional position by executing the current position specification process at Step 105 first. Then, at Step 110, only the altitude information from among the specified three-dimensional position is recorded in the external memory 15.

At Step 120, it is determined which of the high ground, the low ground, and the intermediate ground the current position corresponds to (or is located in). For instance, two thresholds of a reference altitude and a preliminary reference altitude, which is lower than the reference altitude, are defined and compared with the present altitude specified at Step 105. When the present altitude is equal to or higher than the reference altitude, the current position is determined to be the high ground. When the present altitude is lower than the reference altitude and not lower than the preliminary reference altitude, the current position is determined to be the intermediate ground. When the present altitude is lower than the preliminary reference altitude, the current position is determined to be the low ground.

Here, the reference altitude is a threshold value for disabling the HDD 16 from operating at an altitude beyond it in view of risk or fear of breakage of the HDD 16. The threshold value may be constant (for example, altitude of 3000 m), or variable according to various conditions.

Moreover, the preliminary reference altitude is an altitude a little lower than the reference altitude. The value of the preliminary reference altitude may be constant (for example, a specific altitude within from 2900 m to 2999 m), or variable according to various conditions.

When the current position corresponds to the low ground, Step 130 is performed. Here, the operation mode information indicating the usual operation mode is recorded in the external memory 15. Thereafter, one cycle of execution of the program 100 is ended.

When the current position corresponds to the intermediate ground, Step 140 is performed to copy map data and program data in the HDD 16 to the external memory 15. Here, only a portion of the map data in the HDD 16 (henceforth copy portion) is copied to the external memory 15. This can save a data amount of copied data or necessary capacity of the external memory 15.

This copy portion may be map data of a series of high ground areas, including the current position, equal to or higher than the reference altitude. Moreover, when the control circuit 17 executes the route guide, the following copy portion of the map data can be designated. That is, the copy portion corresponds to areas including the above-mentioned high ground areas and their neighboring intermediate ground areas, which include the guide route and its proximity within a predetermined distance (e.g., 2 km) therefrom. Thus, the copy portion can be the map data of the areas including and along the guide route, i.e., the map data to allow the subject vehicle to be guided from the high ground to the low ground. This helps prevent a decrease in the function of displaying the map around the current position in the route guide.

Moreover, program data may be entirely copied in the external memory 15. Alternatively, only a required program may be copied in the external memory 15. For instance, the required program may be the program for route guide or only the program 100 when the program 100 is recorded only in the HDD 16. In addition, if the data which should be copied has been already copied in the external memory 15, the data are not copied again.

At Step 150, the operation mode information indicating the usual operation mode is recorded in the external memory 15. Thereafter, one cycle of execution of the program 100 is ended.

When the current position corresponds to the high ground, the operation of HDD 16 is stopped at Step 155 by stopping the electric power supply to the HDD 16 or outputting an operation stop command to the HDD 16.

At Step 160, the operation mode information indicating the high ground operation mode is recorded in the external memory 15. Thereafter, one cycle of execution of the program 100 is ended.

Thus, the control circuit 17 achieves the following steps by executing the program 100: the navigation apparatus 1 repeatedly specifies to recode a current altitude during the operation (referred to as an operation altitude) (refer to Step 110); when the subject vehicle enters the intermediate ground from the low ground (refer to Step 120), a data portion of the map data (i.e., copy portion) in the HDD 16 is beforehand copied in the external memory 15 (refer to Step 140); when the subject vehicle enters the high ground from the intermediate ground (refer to Step 120), the operation of the HDD 16 is stopped (refer to Step 155); the operation mode changes from the usual operation mode to the high ground operation mode (refer to Step 160); and the control circuit 17 thereby changes the storage for reading out the map data from the HDD 16 to the external memory 15.

The above steps or process are performed at time other than the startup. Before the subject vehicle advances into a position equal to or higher than the reference altitude, the data in the HDD 16 is beforehand recorded in the external memory 15. This decreases the possibility of breakage of the HDD 16 compared with the case where the data in HDD 16 is recorded in the external memory 15 after the subject vehicle enters the high ground.

Moreover, the control circuit 17 starts execution of the program 200, before activating or starting (the operation of) the hard disk drive after the ACC (i.e., an accessory switch) of the subject vehicle is switched from OFF to ON, the main power supply of the navigation apparatus 1 is started, and the navigation apparatus 1 thereby starts. In addition, the program 200 is beforehand (at the time of manufacture of the navigation apparatus 1) recorded in the ROM of the control circuit 17 or the external memory 15.

Figure 2:
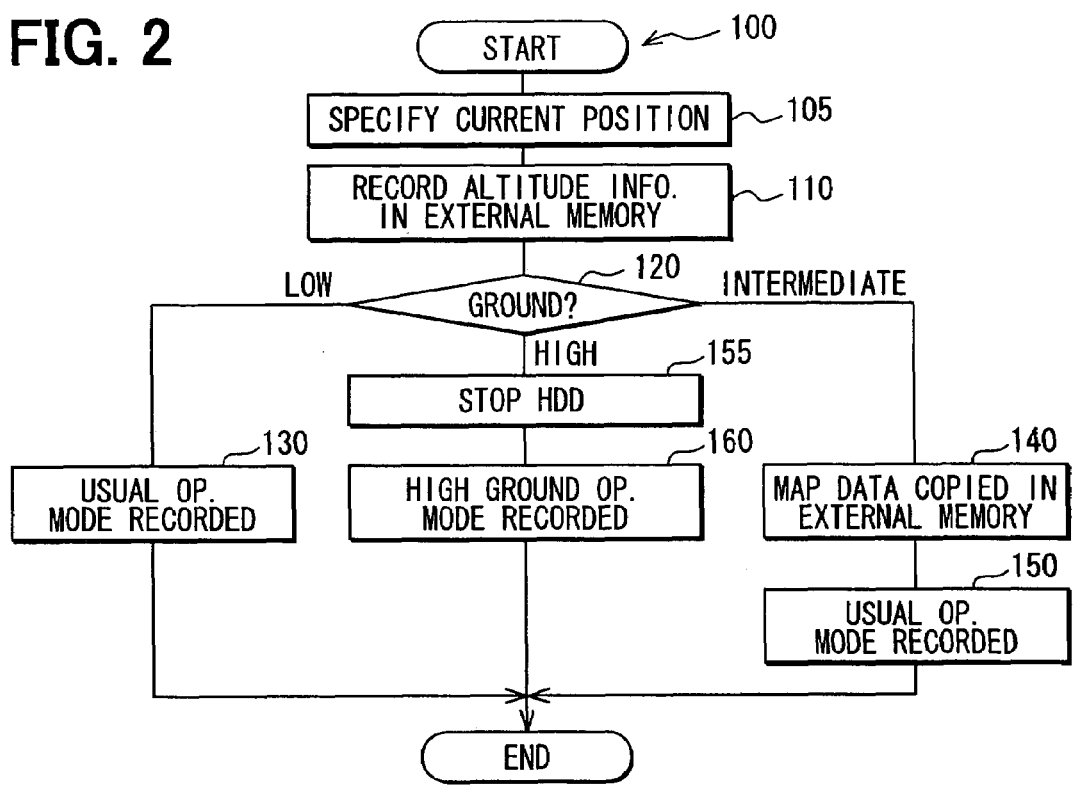
FIG. 2 shows a flow chart of a program repeatedly executed by a control circuit during the operation.
Figure 3:
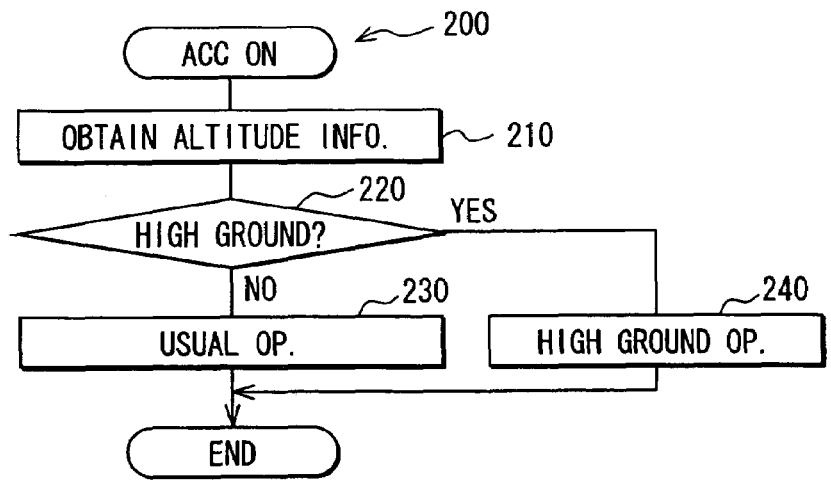

In the execution of the program 200, the control circuit 17 first reads altitude information from the external memory 15 at Step 210. As explained above, the navigation apparatus 1 repeatedly recodes current altitudes during the operation (i.e., operation altitude) (refer to Step 110 in FIG. 2). The position currently recorded in the external memory 15 immediately after the ACC switched from OFF to ON should indicate the altitude of the subject vehicle when the ACC is switched from OFF to ON. This is because the subject vehicle hardly moves while the ACC is OFF.

Then, at Step 220, it is determined whether the current position is in the high ground based on the altitude information read at Step 210. When not in the high ground, the usual operation is performed (refer to Step 230). When in the high ground, the high ground operation is performed (refer to Step 240).

In the usual operation, the operation mode information indicating the usual operation mode is recorded in the external memory 15; further, required map data and program data are read from the HDD 16. In the high ground operation, the operation mode information indicating the high ground operation mode is recorded in the external memory 15; further, required map data and program data are read from the external memory 15 instead of the HDD 16.

Thus, when the subject vehicle is in the position of an altitude lower than the reference altitude at the time of the main power supply start to the navigation apparatus 1 (namely, at the startup), the map data and program data are read from the HDD 16. In contrast, when the subject vehicle is in the position of an altitude equal to or higher than the reference altitude, the map data and program data are read from the external memory 15 while the HDD 16 remains stopped. This can reduce a possibility of breakage of the HDD when the map display control apparatus is started in the high ground while helping prevent lowering the function of displaying the map.

In addition, in the embodiment, the navigation apparatus 1 may be equivalent to an example of the map display control apparatus, the HDD (hard disk drive) 16 may be equivalent to an example of a first storage, and the external memory 15 may be equivalent to an example of a second storage. Moreover, the control circuit 17 may function as an example of the altitude specification means or unit by executing Step 210 of the program 200 at the startup, and functions as a startup control means or unit by executing Steps 220, 230, and 240 at the startup. Moreover, the control circuit 17 may function as an example of the operation altitude specification means or unit by executing Step 105 of the program 100, and function as an example of an un-startup control means or unit by executing Steps 120 to 160 at the time other than the startup. Moreover, the control circuit 17 may function as an example of the route specification means or unit by executing the guide route calculation process.

Other Embodiments

Although the embodiment of present invention is explained above, the present invention is not limited to the above embodiment at all and can be adapted to various embodiments as long as within a technical scope of the present invention.

For example, the external memory 15 may store the map data of the altitude of the 3000 m or more, and its neighborhood at the time of manufacture.

Moreover, after the operation mode goes into the high ground operation mode, the control circuit 17 continues the high ground operation mode until the altitude of the subject vehicle becomes lower than the preliminary reference altitude. This can eliminate necessity of repeating the activation and halt of the HDD 16 when the subject vehicle repeatedly crosses the boundary between the high ground and intermediate ground for a short period.

Moreover, what the control circuit 17 reads at Step 210 may be the operation mode information in the external memory 15. Whether the subject vehicle is currently in the high ground or in other position may be specified also from the operation mode information in the external memory 15. Alternatively, the control circuit 17 may specify the three-dimensional current position using the position detection unit 11 at Step 210.

Moreover, in the embodiment, each function realized by the control circuit 17 executing the program may be materialized using a hardware (for example, FPGA (Field Programmable Gate Array) which can program a circuitry).

Moreover, the map display control apparatus is not limited to the navigation apparatus 1, but may be any device which can display a map.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the subject matter described herein are set out in the following clauses.

As a first aspect, a map display control apparatus in a vehicle is provided as follows. A first storage that is a hard disk drive is included to record map data for displaying. A second storage that is different from a hard disk drive is included to record at least a portion of the map data and be capable of holding recorded data with a main power of the apparatus off. A startup altitude specification unit is configured to specify a startup altitude, which is an altitude of a position of the vehicle at a startup when a supply of the main power is started, while the first storage is not activated. A startup control unit is configured to read the map data from the second storage to thereby cause an image display device to display a map based on the read map data while the first storage is not activated when the specified startup altitude is equal to or higher than a reference altitude, and to activate the first storage and read the map data from the first storage to thereby cause the image display device to display a map based on the read map data when the specified startup altitude is lower than the reference altitude.

Thus, when the subject vehicle is in the position lower than the reference altitude when the main power supply of the map display control apparatus is started (namely, at startup), the map data are read from the hard disk drive. In contrast, when the subject vehicle is in the position equal to or higher than the reference altitude, the hard disk drive remains stopped and the map data are read from the second storage. This can reduce a possibility of breakage of the HDD when the map display control apparatus is started in the high ground while helping prevent lowering the function of displaying the map.

As a second aspect, the map display control apparatus may further comprise an operation altitude specification unit and an un-startup control unit. The operation altitude specification unit is configured to specify an operation altitude, which is an altitude of a position of the vehicle when the apparatus operates except the startup. The un-startup control unit is configured (i) to read the map data from the first storage to thereby cause the image display device to display a map based on the read map data when the specified operation altitude is lower than the reference altitude, (ii) to record at least a portion of the map data, which are recorded in the first storage, in the second storage when the specified operation altitude is lower than the reference altitude and equal to or higher than a preliminary reference altitude lower than the reference altitude, and (iii) to stop the first storage and read the map data from the second storage to thereby cause the image display device to display a map based on the read map data when the specified operation altitude is equal to or higher than the reference altitude.

Thus, at time other than the startup of the map display control apparatus, before the subject vehicle advances into a position higher than the reference altitude, the data in the HDD are beforehand recorded in the second storage. This decreases the possibility of breakage of the HDD compared with the case where the data in the HDD are recorded in the second storage after the subject vehicle enters the high ground.

Moreover, as a third aspect, when the map display control apparatus may have a function to specify a route to a destination, the map display control apparatus records, in the second storage, map data corresponding to the portion, which includes the route, among the map data recorded in the first storage.

This reduces the amount of data which is read from the HDD and recorded in the second storage and helps prevent a decrease in the function of displaying the map.

As a fourth aspect, a computer program product in a medium readable by a computer may be provided. The product comprises the instructions for the computer to function as the startup altitude specification unit and the startup control unit included in the map display control apparatus of the first aspect.

As a fifth aspect, a method is provided for controlling an in-vehicle navigation apparatus having for recording map data a hard disk drive and an additional rewritable memory different from a hard disk drive. The method comprises: (i) specifying a startup altitude, which is an altitude of a position of the vehicle at a startup when a supply of the main power to the navigation apparatus is started, while the hard disk drive is not activated; (ii) reading the map data from the additional rewritable memory to thereby cause an image display device to display a map based on the read map data while the hard disk drive is not activated when the specified startup altitude is equal to or higher than a reference altitude; and (iii) activating the hard disk drive and reading the map data from the hard disk drive to thereby cause the image display device to display a map based on the read map data when the specified startup altitude is lower than the reference altitude.

As a sixth aspect, the method may further comprise: (i) specifying an operation altitude, which is an altitude of a position of the vehicle when the navigation apparatus operates except the startup; (ii) reading the map data from the hard disk drive to thereby cause the image display device to display a map based on the read map data when the specified operation altitude is lower than the reference altitude; (iii) recording at least a portion of the map data, which are recorded in the hard disk drive, in the additional rewritable memory when the specified operation altitude is lower than the reference altitude and equal to or higher than a preliminary reference altitude lower than the reference altitude; and (iv) stopping the hard disk drive and reading the map data from the additional rewritable memory to thereby cause the image display device to display a map based on the read map data when the specified operation altitude is equal to or higher than the reference altitude.

It will be obvious to those skilled in the art that various changes may be made in the above-described embodiments of the present invention. However, the scope of the present invention should be determined by the following claims.

What is claimed is:

1. A map display control apparatus in a vehicle, comprising:
    a first storage being a hard disk drive configured to record map data for displaying;
    a second storage different from the hard disk drive and configured to record at least a portion of the map data, the second storage configured to hold recorded data without a supply of a main power of the apparatus;
    a third storage different from the hard disk drive and configured to record altitude information at a stop time when the main power of the apparatus is switched from an ON state to an OFF state;
    a startup altitude specification unit configured to read the altitude information stored in the third storage under a state that an operation of the first storage is kept not started, when the main power is re-switched from the OFF state to the ON state posterior to the stop time and to specify, based on the read altitude information, a startup altitude, which is an altitude of a position of the vehicle at a startup when the main power is re-switched from the OFF state to the ON state; and a startup control unit configured to read the map data from the second storage instead of the first storage to thereby cause an image display device to display a map based on the read map data in the state that the operation of the first storage is kept not started, when the specified startup altitude is equal to or higher than a reference altitude, and to start the operation of the first storage and read the map data from the first storage to thereby cause the image display device to display a map based on the read map data when the specified startup altitude is lower than the reference altitude.

2. The map display control apparatus of claim 1, further comprising:

an operation altitude specification unit configured to specify an operation altitude, which is an altitude of a position of the vehicle when the apparatus operates except the startup; and an un-startup control unit configured to read the map data from the first storage to thereby cause the image display device to display a map based on the read map data when the specified operation altitude is lower than the reference altitude, to record at least a portion of the map data, which are recorded in the first storage, in the second storage when the specified operation altitude is lower than the reference altitude and equal to or higher than a preliminary reference altitude, which is lower than the reference altitude, and to stop the operation of the first storage and read the map data from the second storage to thereby cause the image display device to display a map based on the read map data when the specified operation altitude is equal to or higher than the reference altitude.

3. The map display control apparatus of claim 2, further comprising:

a route specification unit configured to specify a route to a destination, wherein the un-startup control unit records, in the second storage, map data corresponding to a portion which includes the route among the map data recorded in the first storage.

4. A computer program product in a medium readable by a computer, the product comprising the instructions for the computer to function as the startup altitude specification unit and the startup control unit included in the map display control apparatus of claim 1.

5. A method for controlling an in-vehicle navigation apparatus having, for recording map data, a hard disk drive and a rewritable memory different from the hard disk drive and configured to hold recorded data without supply of a main power of the navigation apparatus, the navigation apparatus further having an additional memory different from the hard disk drive and configured to record data without supply of the main power of the navigation apparatus, the method comprising:

recording, in the additional memory altitude information at a stop time when a main power of the navigation apparatus is switched from an ON state to an OFF state;

reading the altitude information stored in the additional memory under a state that an operation of the hard disk drive is kept not started, when the main power is re-switched from the OFF state to the ON state posterior to the stop time and to specify, based on the read altitude information, a startup altitude, which is an altitude of a position of the vehicle at a startup when the main power to the navigation apparatus is re-switched from the OFF state to the ON state;

reading the map data from the memory instead of the hard disk drive to thereby cause an image display device to display a map based on the read map data in the state that the operation of the hard disk drive is kept not started, when the specified startup altitude is equal to or higher than a reference altitude; and starting the operation of the hard disk drive and reading the map data from the hard disk drive to thereby cause the image display device to display a map based on the read map data when the specified startup altitude is lower than the reference altitude.

6. The method of claim 5, further comprising:

specifying an operation altitude, which is an altitude of a position of the vehicle when the navigation apparatus operates except the startup;

reading the map data from the hard disk drive to thereby cause the image display device to display a map based on the read map data when the specified operation altitude is lower than the reference altitude;

recording at least a portion of the map data, which are recorded in the hard disk drive, in the memory when the specified operation altitude is lower than the reference altitude and equal to or higher than a preliminary reference altitude lower than the reference altitude; and stopping the hard disk drive and reading the map data from the memory to thereby cause the image display device to display a map based on the read map data when the specified operation altitude is equal to or higher than the reference altitude.

7. The map display control apparatus of claim 1, further comprising:

a GPS receiver configured to be used for detecting an altitude, wherein:

the third storage is configured to record the altitude information, which is determined based on the GPS receiver; and the startup altitude specification unit is configured to read the altitude information stored in the third storage when the main power is re-switched from the OFF state to the ON state, and specify the startup altitude using the altitude read from the third storage instead of using the altitude detected by the GPS receiver when the main power is re-switched from the OFF state to the ON state.

8. The map display control apparatus of claim 1, wherein the reference altitude is predetermined.

* * * * *